United States Patent

[11] 3,575,274

[72] Inventors Sylvester E. Ewing
 Pine Brook;
 Jacob Hubee, Wayne, N.J.
[21] Appl. No. 771,783
[22] Filed Oct. 30, 1968
[45] Patented Apr. 20, 1971
[73] Assignee Hewitt-Robins, Incorporated
 Stamford, Conn.

[54] CONVEYOR FRAME SUPPORTED INSPECTION AND SERVICE VEHICLE
 10 Claims, 4 Drawing Figs.

[52] U.S. Cl. ............................................. 198/1,
 104/1;118, 104/120;124, 105/1;261;141, 105/145,
 198/191;204
[51] Int. Cl. ..................................................B65g 15/08,
 B65g 15/60, B65g 21/00
[50] Field of Search........................................ 105/144;
 105/1, 26.1, 141, 145; 104/138; 104/1, 118, 120,
 124; 198/1, 191, 204; 198/99

[56] References Cited
UNITED STATES PATENTS

| 1,876,307 | 9/1932  | Langbein......................... | 198/1    |
| 3,297,141 | 1/1967  | Janitsch et al. ................ | 198/99X  |
| 121,539   | 12/1871 | Newbrough..................... | 105/145  |
| 637,005   | 11/1899 | Knudsen......................... | 105/144X |
| 818,608   | 4/1906  | Brower........................... | 105/145X |
| 1,523,335 | 1/1925  | Wright ............................ | 105/145X |

Primary Examiner—Arthur L. La Point
Assistant Examiner—Howard Beltran
Attorneys—John L. Shortley and John D. Boos ABSTRACT: A self-propelled vehicle is provided which rides on the side beams of long length conveyors. A first lifting mechanism is provided in the vehicle which removes the protective cover from the conveyor. A second lifting mechanism is provided having a lifting head that permits the elevated conveyor belt to continue operation while the defective idler roll is repaired or replaced.

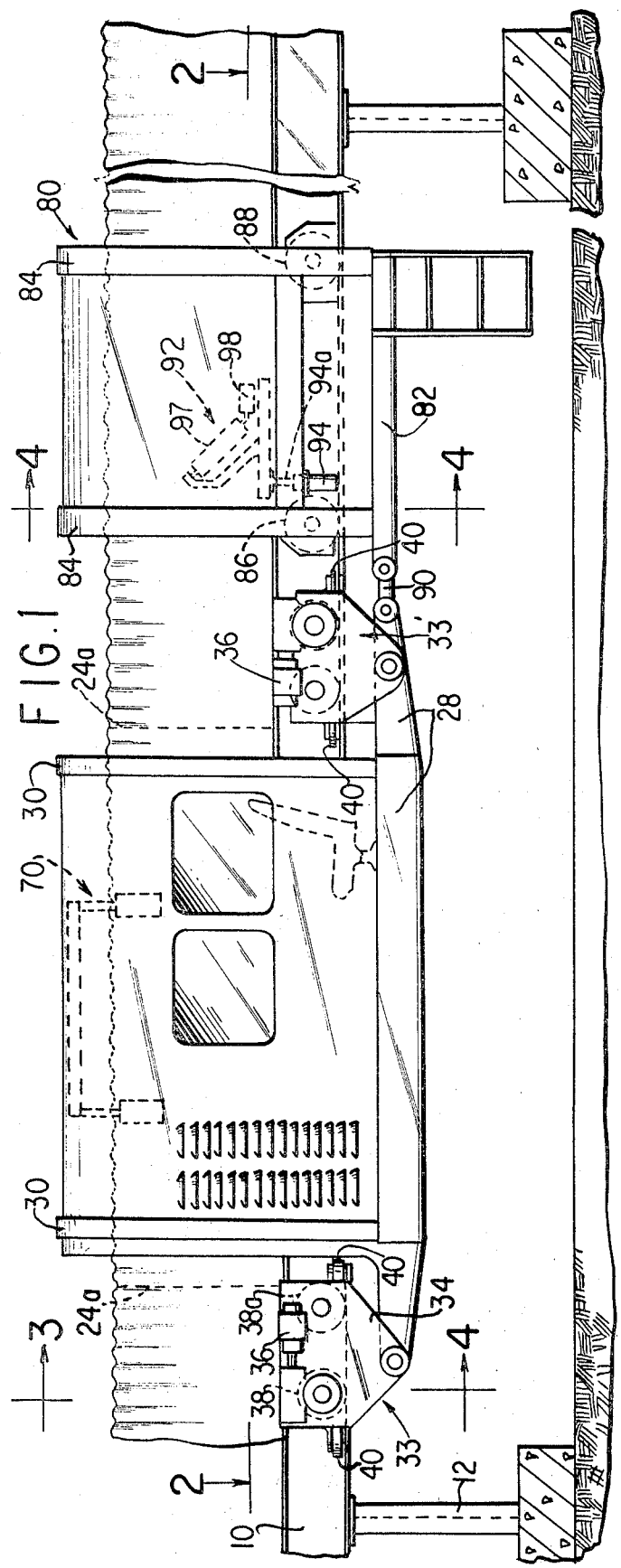
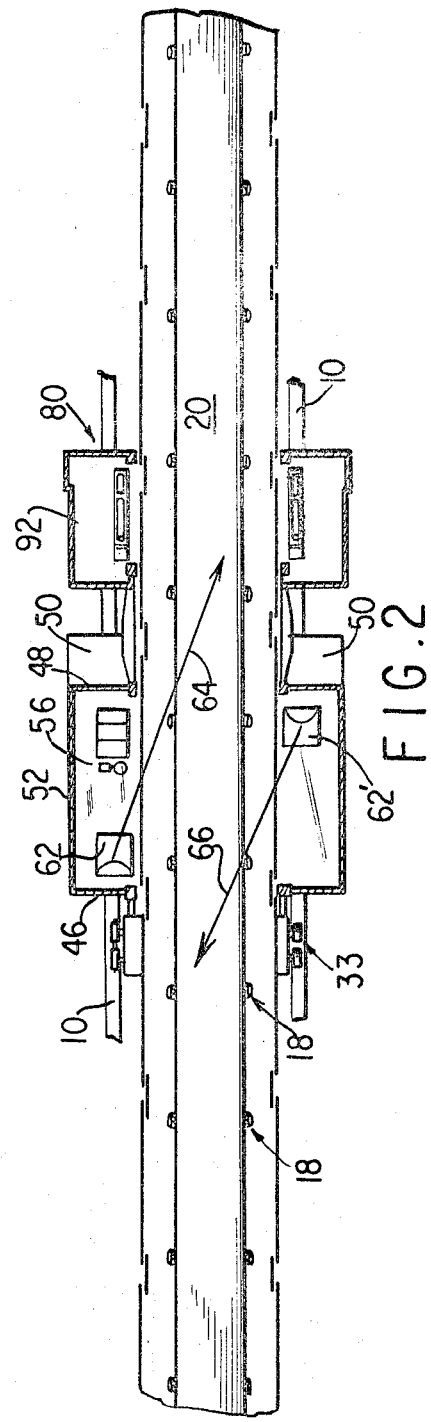
INVENTORS
SYLVESTER E. EWING
JACOB HUBEE
BY
ATTORNEY

INVENTORS
SYLVESTER E. EWING
JACOB HUBEE
BY
John L. Bros
ATTORNEY

CONVEYOR FRAME SUPPORTED INSPECTION AND SERVICE VEHICLE

BACKGROUND OF THE INVENTION

This invention relates to inspection and service vehicles for conveyor systems and more particularly to vehicles for inspecting and servicing the idler roller assemblies of endless belt conveyor systems.

Periodic inspections must be made of the idler roller assemblies in endless belt conveyors in order to ensure that the bearings are greased and that the idler roller assemblies are operating properly. Any defective assemblies must be serviced or replaced. This inspection and service procedure will generally pose no problem for relatively short length conveyors, since a serviceman can simply walk along the length of the conveyor checking each idler roll assembly and standard service procedures can be followed in replacing or servicing any defective assemblies. However, in intermediate or long length conveyors, there are numerous problems encountered in attempting to both inspect and service these idler assemblies. For example, in a 50 or 60 mile conveyor system there would be several independent conveyors arranged in series with the head end of one conveyor discharging onto the tail end of the next conveyor. This type of conveyor system frequently extends over many different types of terrain such as hills, desserts, swamps, and bodies of water. Furthermore, it is generally necessary to provide an enclosing or protective structure over the conveyor in order to prevent pilferage, tampering, and to protect the conveyor from the effects of the weather. To alleviate the problems of inspecting and repairing this type of conveyor, it is necessary that a mechanized or at least a partially mechanized inspection device be employed.

SUMMARY OF THE INVENTION

The above-described inspection and service problems are solved in the present invention by providing a self-propelled vehicle having an inspection section which travels along the structural side beams that support the idler roll assemblies of the conveyor system and which vehicle has means for mechanically raising the protective enclosure structure in order to permit inspection and/or servicing of the idler roll assemblies by one or more persons riding in the vehicle. The vehicle also has a service trailer which is adapted to be hauled behind the inspection section. The service trailer has a hydraulically operated servicing assembly that can raise the conveyor belt off the defective idler roll assemblies in order to permit ready access for service or replacement purposes.

Accordingly, an object of the present invention is to provide a self-propelled vehicle which travels on the conveyor side beams that support the idler roll assemblies of an endless belt conveyor.

Another object is to provide a self-propelled inspection vehicle which is provided with a cover lifting mechanism for raising a section of the protective housing away from the conveyor system in order to thereby permit the inspection of a section of the conveyor.

Still another object of this invention is to provide a self-propelled conveyor inspection vehicle having a service section in combination with the inspection section.

A further object is to provide a vehicle which rides upon the spaced side beams of an endless belt conveyor and which has a separate cab or compartment located on the outside of the spaced beams which permit inspection of the idler roll assemblies supporting the conveyor belt from within the cab structure.

Still a further object of this invention is to provide a service trailer which rides on the side rails of an endless belt conveyor and which is provided with a conveyor belt lifting mechanism.

DESCRIPTION OF THE VEHICLE

Other objects, advantages and novel features of the present invention will will become apparent from the following detailed description of the invention when considered in conjunction with the accompanying drawings wherein:

FIG. 1 is a side elevation of the enclosed conveyor and showing both the inspection vehicle and the service trailer;
FIG. 2 is a section taken along line 2—2 of FIG. 1;
FIG. 3 is a section taken along line 3—3 of FIG. 1;
FIG. 4 is a section taken along line 4—4 of FIG. 1, with parts omitted, and with the belt lifting means shown in operative position.

DETAILED DESCRIPTION OF THE PREFERRED EMBODIMENT

Figure 3:
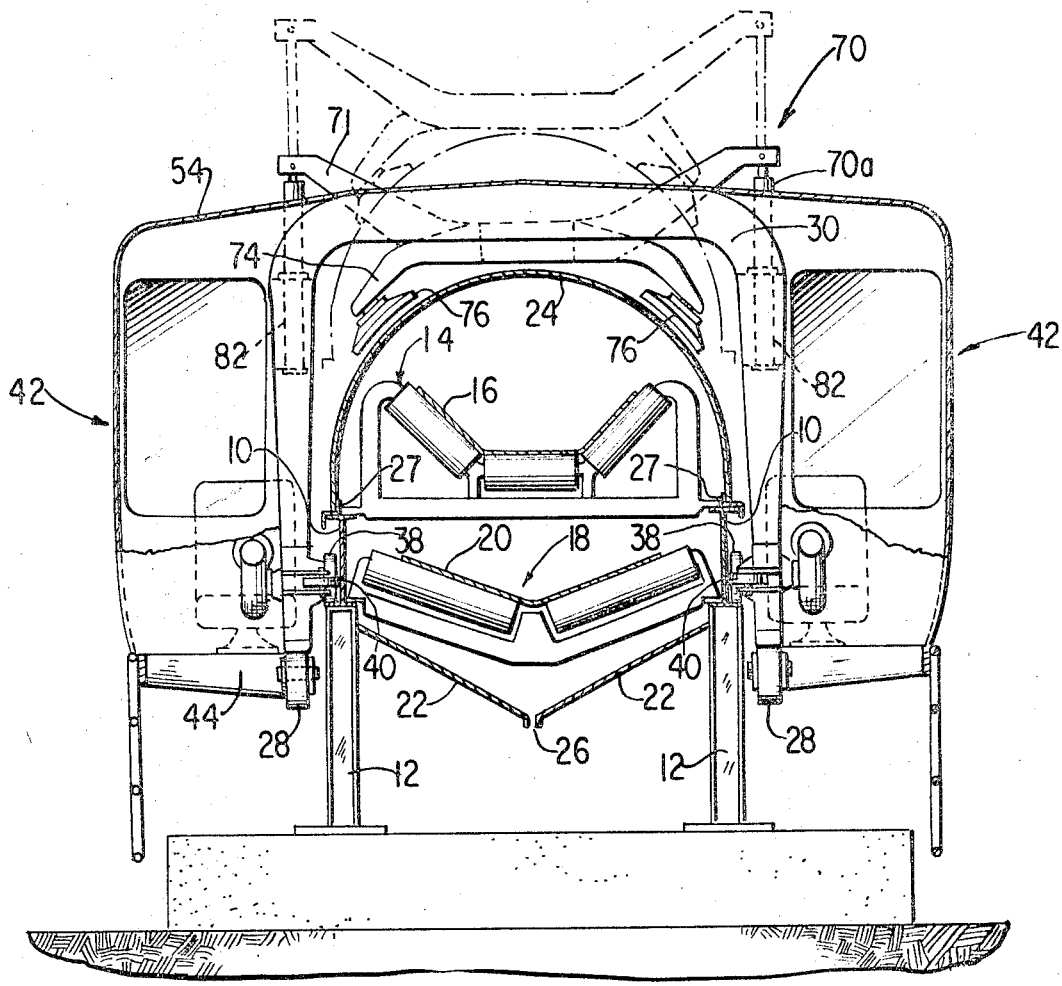

The conveyor system illustrated has spaced parallel side beam members 10 mounted on structural support pedestals 12. Spanning the side members are troughing idler roll assemblies 14 supporting the carrying strand or section 16 of an endless conveyor belt and return idler roll assemblies 18 supporting the return strand 20 of the conveyor belt. The conveyor belt is reeved about head and tail pulleys, not shown, and in long conveyor systems there would be two or more conveyor flights arranged in series with the head end of one conveyor positioned in material transfer relationship with the tail end of the next following conveyor. One complete vehicle having an inspection section 21 and a repair section 80 would normally be provided for each conveyor flight.

A protective enclosing structure comprising individual bottom trough plates 22 and individual removable hood covers sections 24 surround and protect the conveyor. The opposite ends of one hood cover section is indicated at 24a, 24a. The bottom trough plates are attached to the bottom of the side beams and decline toward the center. The trough plates are spaced apart slightly from each other so as to form a dust escape slot 26. The protective hood cover sections 24 are positioned over the top of the conveyor by the upstanding legs of structural Z-sections 27 mounted on the top of the side beams. The individual removable hood covers sections are each made up of several semicircular overlapping sheets secured together so as to form a unit having a length a little shorter than the length of the vehicle, as shown in FIG. 1, and 3. Fixed semicircular support bands, not shown, are provided between each hood cover section and these bands are permanently attached to the conveyor side beams. A clamping device, not shown, on each side of the conveyor secures each cover section in position. This clamping device is released by the inspectors riding in the vehicle with special equipment.

The main structural support frame for the inspection section of the vehicle comprises two spaced, parallel side frame members 28 coupled together by two portal-type rigid frames 30. The spacing of the side members and the shape and height of the portal members are designed so that the vehicle may straddle the conveyor structure with frame members 28 positioned on either side of the conveyor as shown in FIGS. 1 and 3.

Pivotally coupled to the front and rear of each side frame member are rail support means, such as powered drive trucks 33, 33' which are adapted to support the vehicle on the side support rails of the conveyor and which enables the vehicle to travel back and forth along the length of the conveyor. Each drive truck comprises a frame 34 pivotally coupled to the side member of the main support frame, and has a reversible motor 36 and suitable gearing, not shown, mounted thereon which drives both of the rotatably mounted wheels 38, 38a, over the lower flange of the conveyor side rail. Two horizontal guide wheels 40 are mounted on either side of the traction wheels which roll against the web portion of the conveyor side beams. The controls for the drive trucks are located within the cabins.

The vehicle is formed with a cabin means comprising a cabin 42 mounted on each side of the main support frame. Each cabin is a partially enclosed chamber having front wall 46, rear wall 48, outside wall 52, ceiling 54 and floor 56. There are no interior walls in the cabins so that persons in the cabins may have access to, and a clear view of, the conveyor.

A door, not shown, is formed in the rear wall of each cabin which permits entry and exit. The floor extends beyond the end wall of the cabin so as to form a platform 50 immediately outside the door. Adjustable flood lights, not shown, are provided in the cabin which can be trained to illuminate the conveyor section being inspected. The cabin located on the left side of the conveyor, as seen in FIG. 3, is provided with a seat 62 located front of the cabin which faces rearward in order to allow an inspector sitting in the seat to look in a generally rearward direction, as indicated by arrow 64 and thereby inspect the idler rolls on one side of the conveyor. The cabin located on the right side of the conveyor, as seen in FIG. 3, is outfitted with a seat 62 located in the rear of the cabin which faces forward and permits an inspector sitting in this seat to look in a generally forward direction as indicated by the arrow 66 and thereby inspect the idler rolls on the other side of the conveyor. The remaining necessary auxiliary equipment such as generators, hydraulic systems and storage batteries, are compactly stored in the vehicle and generally within the cabins.

Mounted between the cabins and extending over the conveyor cover is a cover lifting means 70 which can raise or lower a complete hood-cover section. The cover lifting means basically includes a releasable coupling means, such as electromagnets 76, which are actuated vertically by powered actuating devices, such as hydraulic jack mechanisms 72. The jack devices are mounted on on opposite sides of the vehicle and a support yoke 71 extends over the conveyor enclosure and is coupled to the outer ends of shafts 72a of the piston portion of the jack devices. The yoke, in turn, supports a spider frame 74 carrying four electromagnets 76. The faces of the electromagnets are contoured so that they will make substantial surface-to-surface contact with the curved section of the conveyor hood cover, as shown in FIG. 3. The controls for energizing the electromagnets are located in one cabin.

Coupled to the rear of the inspection section of the vehicle is the service section or repair trailer 80. The support frame of the service section is constructed of side members 82 and two portal-type rigid frames 84 in a manner similar to that described for the main support frame of the inspection section so that the inspection section may also straddle said conveyor. Wheels 86, 88 are rotatably mounted at the front and rear, respectively, of each side member and are adapted to ride on the lower outside flanges of the conveyor side beams. The front end of side members 82 of the service section are coupled to the rear end of side members 28 by releasable coupling means, such as link 90, whereby the service section can be articulated relative the inspection vehicle and whereby the driven inspection section will pull the service section behind it in a trailerlike fashion. It should be noted that the above-described trailer is the preferred design but that the repair section could also be made integral with the inspection section so that two sections would always move as a single unit.

A belt lifting means comprising two cooperating belt lifting mechanisms 92 are coupled to the service section of the vehicle. A belt lifting mechanism 92 is mounted on each side frame member and each belt lifting mechanism includes a powered elevating means, such as the hydraulic jack 94, and an idler roll head 96 that is actuated by the hydraulic jack. The jack is mounted so as to be able to move the idler roll head vertically between an extended and a retracted position. Each idler roll head assembly is essentially similar to one-half the troughing idler roll assembly employed in the conveyor and includes one rotatably mounted inclined side roll 97 and one short horizontal center roll 98. The idler roll head is pivotally connected to the actuated shaft 94a of the actuating mechanism in such a manner that the head can be swung 90° from the inoperative position shown in FIG. 1 to the operative position shown in FIG. 4. When both heads are swung into the operative position, the two idler roll heads cooperate to form a troughed belt support means which permits the belt lifting mechanisms to raise a conveyor belt off of a particular troughing idler assembly when jacks are actuated so as to move the idler roll heads into an extended position. A hydraulically actuated latch device 99 is employed to lock the two idler roll heads in operative position.

Figure 4:
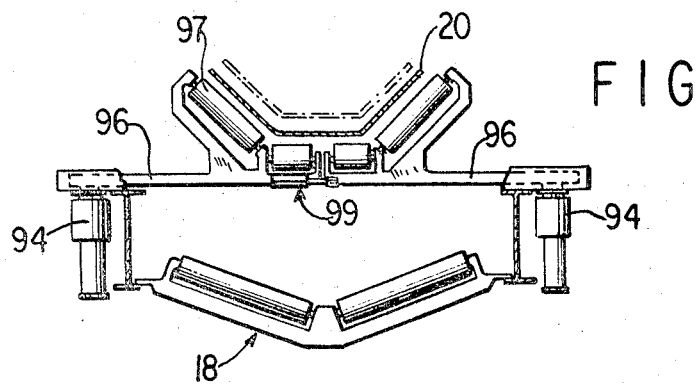

In operation, the inspection and service vehicle is driven along over the conveyor with one inspector in each cabin. When the section of the conveyor to be inspected is reached, the vehicle is accurately located over one of the cover sections 24. For this purpose a proximity switch on the vehicle can be employed with suitable electrical controls, well known in the art, so as to permit the vehicle to stop at the same precise location relative to each section of the removable hood covers. After releasing the locks holding the hood cover in place, the cover lifting mechanism is actuated by lowering the electromagnets 76 into contact with the cover section. The cover section is then raised by the lifting mechanism 70 and each inspector checks the idlers and idler bearings within his range of vision from his side of the conveyor. If a defective idler roll assembly is discovered which necessitates servicing or replacement, the vehicle is repositioned with the service section of the vehicle located over the defective assembly and the idler roller heads would be swung into the operative position under the conveyor carrying strand as shown in FIG. 4. The belt lifting mechanism is then actuated so as to raise the conveying strand of the belt off the defective assembly and enabling replacement without stopping the conveyor. After the idler assembly has been serviced or replaced, the conveying strand can be lowered to its normal path of travel. The cover section is then lowered into position and the vehicle is moved to a new location over another cover section. If none of the idler assemblies are found defective, the cover section is lowered into position and the vehicle is moved to a new location. If one of the return idlers are found to be defective, then a similar replacement procedure is followed, employing a portable belt lifting device, not shown, and which forms no part of the present invention.

It will be recognized that the present invention provides a self-propelled vehicle having an inspection section and a service section which ride on the side beams of long length conveyors. The basic concept behind this invention entails simply a vehicle which rides along the side rails of a conveyor which facilitates inspection of the vehicle. In the event the conveyor includes a removable protective cover over the conveyor, then a special lifting mechanism is provided on the vehicle which is adapted to remove the cover. Finally, a second lifting mechanism is provided on the vehicle which elevates the conveyor belt off of a defective idler in order to facilitate servicing or replacement. This second lifting mechanism is specifically provided with a lifting head which permits the elevated conveyor belt to continue to operate under full load during the time that a defective idler roll is being repaired or replaced.

Obviously, many modifications and variations of the present invention are possible in light of the above teachings. It is therefore to be understood that within the scope of appended claims, the invention may be practiced otherwise than has been specifically described.

We claim:

1. A vehicle for use in combination with a conveyor, said conveyor comprising spaced-apart side support rails and conveying means mounted thereon, said vehicle mounted for travel on said side support rails, said vehicle having an inspection section comprising spaced-apart side frame members which are substantially parallel to each other and which are coupled together by spaced-apart portal members, rail support means mounted at each end of said side frame members for supporting said inspection section on said side support rails, and cabin means formed on said side frame members which enable persons in said cabin means to inspect said conveying means when said inspection section is supported on said side support rails.

2. A vehicle as described in claim 1 wherein each of said rail support means comprises a powered drive truck pivotally coupled to one of said side frame members, said powered drive trucks adapted to propel said inspection section along the length of said conveyor.

3. A vehicle as defined in claim 1 wherein said conveying means further comprises spaced troughing idlers mounted between said side support rails, a conveyor belt having a conveying section thereof supported by said troughing idlers and wherein said vehicle is further characterized by a service section having a belt lifting means mounted thereon which is adapted to lift the conveying section of said conveyor belt off of at least one of said troughing idlers.

4. A vehicle as described in claim 3 wherein said belt lifting means comprises a belt lifting mechanism mounted on each of said side frame members, each of said belt lifting mechanisms comprising powered elevating means coupled to one of said side frame members, idler head means coupled to said powered elevating means and being movable between an operative and an inoperative position, said powered elevating means adapted to move said idler head means between an extended and a retracted position.

5. A vehicle as described in claim 4 wherein each of said idler head means comprises a rotatably mounted horizontal roll and a rotatably mounted inclined roll, said rolls on each of said idler head means being positioned so that when both of said idler head means are moved into an operative position, they combine to form a trough belt support means which is similar to the troughing idlers of the conveyor and which permits the conveyor belt to be lifted off of one conveyor troughing idler when said trough belt support means is positioned under the conveyor belt and when said powered elevating means have moved said idler means into an extended position.

6. A vehicle as defined in claim 1 wherein said conveyor further comprises removable hood covers spanning said side support rails and said conveying means, said vehicle being further characterized by cover lifting means coupled to said inspection section for removal of said hood covers.

7. A vehicle as defined in claim 6 wherein said cover lifting means comprises powered actuating means mounted in each of said cabin structures, electromagnetic means for releasably holding said hood covers, said electromagnetic means coupled to said powered actuating means, said powered actuating means moving said electromagnetic means between an extended and a retracted position, said electromagnetic means contoured so as to provide substantial surface-to-surface contact with said hood covers.

8. A vehicle for use in combination with a conveyor, said conveyor comprising spaced-apart side support rails, spaced troughing idlers mounted between said support rails, a conveyor belt having a conveying section thereof supported by said troughing idlers, said vehicle comprising a service section having a frame designed so as to straddle said conveyor, wheel means mounted on said frame for movably supporting said service section on said side support rails, a belt lifting means coupled to said frame of said service section for lifting the conveying section of said conveyor belt off of at least one of said troughing idlers.

9. A vehicle as described in claim 8 wherein each of said idler head means comprises a rotatably mounted horizontal roll and a rotatably mounted inclined roll, said rolls on each of said idler head means being positioned so that when both of said idler head means are moved into an operative position, they combine to form a trough belt support means which permits the conveyor belt to be lifted off of one of said troughing idlers when said trough belt support means is positioned under the conveyor belt and when said powered elevating means have moved said idler head means into an extended position.

10. A vehicle as described in claim 9 which is further characterized by latch means on said head means for locking said head means in operative position.